United States Patent [19]

Sinn et al.

[11] 4,161,456

[45] Jul. 17, 1979

[54] BASE MATERIAL FOR ARTIFICIAL LEATHER

[75] Inventors: Gustav Sinn, Leverkusen; Martin Matner, Odenthal; Hermann J. Bross, Leverkusen, all of Fed. Rep. of Germany

[73] Assignee: Bayer Aktiengesellschaft, Fed. Rep. of Germany

[21] Appl. No.: 880,899

[22] Filed: Feb. 24, 1978

Related U.S. Application Data

[60] Division of Ser. No. 822,000, Aug. 5, 1977, which is a continuation of Ser. No. 650,532, Jan. 19, 1976, abandoned.

[30] Foreign Application Priority Data

Jan. 23, 1975 [DE]  Fed. Rep. of Germany ....... 2502654
Jan. 23, 1975 [DE]  Fed. Rep. of Germany ....... 2502644

[51] Int. Cl.$^2$ .............................................. B32B 7/14
[52] U.S. Cl. .................................... 252/182; 427/246;
427/377; 427/381; 427/387; 427/389; 427/390 R; 428/290; 428/904

[58] Field of Search .......................... 252/182; 264/41;
427/245, 246, 377, 378, 381, 385 R, 385 B, 387, 389, 390 R; 428/290, 317, 904

[56] References Cited

U.S. PATENT DOCUMENTS

| 3,578,481 | 5/1971 | Young ................................ 260/824 |
| 3,922,419 | 11/1975 | Hammer et al. ..................... 428/198 |
| 3,961,107 | 6/1976 | Hammer et al. ..................... 427/246 |

*Primary Examiner*—Benjamin R. Padgett
*Assistant Examiner*—Irwin Gluck
*Attorney, Agent, or Firm*—Connolly and Hutz

[57] ABSTRACT

A base material for artificial leather having a water vapor absorption capacity of from 2 to 8% by weight, based on a fibre fleece impregnated with a rubber latex mixture containing a heat sensitizer, a quick-acting vulcanization accelerator and, as expanding agent, a silicone oil emulsion or an inert, emulsifiable substance which is insoluble both in the rubber and the other constituents of the latex. After the impregnation of the fibre fleece, the latex mixture is coagulated by heat, vulcanized and then dried.

1 Claim, No Drawings

BASE MATERIAL FOR ARTIFICIAL LEATHER

CROSS-REFERENCE TO RELATED APPLICATIONS

This application is a division of application Ser. No. 822,000 filed Aug. 5, 1977 which in turn is a continuation of application Ser. No. 650,532 filed Jan. 19, 1976 and now abandoned.

This invention relates to a base material for artificial leather based on fibre fleeces impregnated with a rubber latex, and to a process for the production of this base material. The base material for artificial leather according to the invention has a particularly high water vapour absorption capacity which reaches about 70% to 80% of the absorption capacity of natural leather.

Microporous sheet-form materials permeable to water vapour and based on substrates impregnated with rubber latices are known from DT-AS No. 1,570,088. Although these products are microporous and, hence, show a certain permeability to water vapour, they have no absorption capacity for water vapour. The process by which they are produced is unsuitable in practice for the production of large surfaces on a commercial scale because the latex mixtures used are only stable for a short period and, hence, are unsuitable for continuous impregnating processes.

Accordingly, there is a need to provide a base material for artificial leather which, on the one hand, has a high water vapour absorption capacity and which, on the other hand, can be manufactured easily and reproducibly. The water vapour absorption capacity is particularly important because it is one of the most outstanding properties of natural leather and, hitherto, it has never been adequately reproduced in synthetic products.

Accordingly, the present invention provides a base material for artificial leather based on a fibre fleece impregnated with a rubber latex, which is characterised by a water vapour absorption capacity of from 2 to 8% by weight, based on the dry weight of the material, a tensile strength of from 30 to 250 kg/cm$^2$ and an elongation at break of from 30 to 150%.

The process for producing this base material for artificial leather by impregnating a fibre fleece with a rubber mixture, coagulating the mixture, followed by vulcanisation, is distinguished by the fact that a fibre fleece is impregnated with a rubber latex mixture containing a heat sensitiser, a quick-acting vulcanisation accelerator and, as expanding agent, a silicone oil emulsion or an inert, emulsifiable substance which is insoluble both in the rubber and in the other constituents of the latex and, after coagulation of the latex mixture by heating it, is vulcanised, preferably in steam, and then dried.

Fibre fleeces suitable for the production of the artificial leather base material are, in particular, fleeces consisting of natural and/or synthetic fibres. Polyamide, polyester, polypropylene, viscose and cellulose fibres are preferably used.

Rubber latices suitable for impregnation are, in principle, any heat-sensitisable natural or synthetic rubber latices. Particularly suitable rubber latices are natural rubber latex and synthetic rubber latices such as, for example, carboxylated and non-carboxylated latices based on copolymers of butadiene/acrylonitrile, butadiene/styrene, chloroprene and butadiene/acrylic acid esters, and also isoprene and corresponding copolymers. In addition, the polymers may contain acid amide functions and autocrosslinking groups such as, for example, N-methylol acrylamide.

Heat sensitisers which may be used in accordance with the invention are, for example, polyvinyl methyl ethers, polyethylene- and polypropylene oxide adducts and/or their co-adducts, polyalkyl and polyaryl siloxanes and ethylene diamine polyether adducts.

Vulcanisation agents are, for example, dispersion mixtures consisting of sulphur, zinc oxide and vulcanisation accelerators. In the case of reactive polymers which normally crosslink in the absence of sulphur and vulcanisation accelerators, suitable crosslinking agents are condensation products of melamine, urea or phenol with formaldehyde, or metal oxides.

It is preferred, however, to use polymers which contain no autocrosslinking groups. For the crosslinking of these polymers according to the present invention the latex is compounded with a mixture suitable for vulcanisation, preferably in form of a dispersion or a paste. This paste contains in addition to water, a dispersing agent, and known fillers like titanium dioxide the usual vulcanising agents like sulfur and zinc oxide and according to the invention a quick-acting water-soluble vulcanisation accelerator besides a water-insoluble vulcanisation accelerator.

The presence of a quick-acting vulcanisation accelerator is of particular importance. Suitable quick-acting vulcanisation accelerators are, primarily, water-soluble sodium or ammonium salts of various derivatives of dithiocarbamic acid, optionally in combination with salts of mercaptobenzothiazole.

Quick-acting water-soluble vulcanisation accelerators are for example the alkaline metal, alkaline earth metal, and ammonium salts of dimethyl, diethyl, diisopropyl and dibutyl dithiocarbamic acid.

Water-insoluble vulcanisation accelerators are for example the zinc salts of the above-mentioned dithiocarbamic acids, mercaptobenzothiazole and its zinc salts, thiurame and its derivatives.

A suitable dispersing agent is for example the condensation product of naphthalene sulfonic acid and formaldehyde.

The vulcanisation paste according to the present invention is composed as follows:

0.5 to 10.0 parts by weight of zinc oxide, preferably about 5.0 parts by weight 0.2 to 10.0 parts by weight of sulfur, preferably about 2.0 parts by weight 0.2 to 3.0 parts by weight of water-soluble accelerator, preferably about 1.0 parts by weight 0.2 to 3.0 parts by weight of a water-insoluble accelerator, preferably about 1.0 parts by weight 2.0 to 15.0 parts by weight of titanium dioxide, preferably about 5.0 parts by weight 0.1 to 5.0 parts by weight of a dispersing agent, preferably about 1.0 parts by weight 10.0 to 50.0 parts by weight of water, preferably about 25.0 parts by weight.

The amount of vulcanisation paste to be applied may vary over a wide range. Usually 10 to 100 parts by weight, preferably 30 to 50 parts by weight, and most preferably 40 parts by weight of the vulcanisation paste are applied on 100 parts by weight of rubber (based on the weight of dry substance).

The vulcanisation paste is prepared by adding the rest of the components to the water and the dispersing agent or to an according solution of the dispersing agent in water, respectively. The mixture and its ingredients are then intensively mixed and triturated for 12 to 72 hours, preferably for 24 hours, for example in a roller mill. In this way a vulcanisation paste is obtained which is ready for use and contains its ingredients in a finely divided form.

Insoluble and inert substances suitable for use as expanding agents in accordance with the invention are:
(1) long-chain aliphatic or alicyclic isocyanates,
(2) condensates of N-methylolated melamine, urea or cyclic ureas with long-chain fatty acids or their amides, long-chain alcohols and long-chain amines,
(3) perfluorinated long-chain aliphatic compounds,
(4) polyvinyl methyl ethers,
(5) mixtures of epoxide resins with polyether siloxane,
(6) mixtures of polyethylene with polyether siloxane,
(7) mixtures of the products mentioned in (1) to (6).

Examples of products of this kind are stearyl isocyanate; the condensate of hexamethylolated melamine with behenic acid; perfluorinated stearic acid; polyvinyl methyl ethers having a molecular weight in the range of from 30,000 to 70,000 and mixtures of low molecular weight polyethylene with polyether siloxane.

Silicone oils which are particularly suitable for use as expanding agents are silicone oils having a viscosity of from 50 to 1000 cP which are used in the form of aqueous emulsions having a solids content of, preferably, from 10 to 50% and which preferably contain non-ionic emulsifiers.

In general, the rubber latex mixture contains from 100 to 300 parts by weight, preferably about 220 parts by weight, of water; 100 parts by weight of rubber; from 0.5 to 5 parts by weight, preferably about 1.0 part by weight, of heat sensitiser; from 3 to 10 parts by weight, preferably about 7.0 parts by weight, of vulcanisation agent; from 1 to 4 parts by weight, preferably about 2.0 parts by weight of vulcanisation accelerator; and from 0.5 to 10 parts by weight, preferably about 5.0 parts by weight, of expanding agent.

The fibre fleece is impregnated with this mixture in the usual way, a quantity of from 50 to 200%, based on the fibres, generally being used.

The fleece thus obtained is then heated to a temperature of from 25° to 80° C. Since the latex mixture contains a heat sensitiser, it is stable below this temperature, but coagulates very quickly above a predetermined critical temperature. After coagulation, the impregnated fibre fleece has to be immediately vulcanised. It is important to carry out vulcanisation as quickly as possible. For this reason, vulcanisation is preferably carried out with steam at temperatures in the range from 100° to 200° C. Vulcanisation generally lasts from 5 to 60 minutes. The vulcanised, impregnated fibre fleece may then be dried in the usual way, for example in vacuo, at 100° to 170° C.

An artificial leather base material whose outstanding property is its water vapour absorption capacity is obtained in this way. It may be provided with a surface layer in known manner, for example by applying a thin microporous polyurethane layer. It may then be finished, again in the usual way, to give a particularly high-quality artificial leather whose properties substantially correspond to those of natural leather.

EXAMPLE 1

A needle-punched and subsequently shrunk random fibre fleece, consisting of 60% by weight of polyamide fibres (approximately 40 mm staple length and 1.5 den) and 40% by weight of polyester fibres (approximately 40 mm staple length, 1.5 den), is impregnated with an excess of a latex mixture having the composition specified below, so that 100 g of solids are taken up from the latex mixture per 100 g of fibre material. The impregnated fleece is then quickly heated to 50° C., as a result of which the latex mixture gels. After vulcanisation with steam for 30 minutes at 105° C., the fleece is dried in hot air. The fleece is then split so that the end product has the layer thickness indicated in Table 1. A microporous base material for artificial leather is obtained. The fleece has a water vapour absorption capacity of 4.4% (as determined by the method described below).

The latex mixture used has the following composition:
210.0 parts by weight of a 47% latex of a copolymer of 85% by weight of butadiene and 15% by weight of acrylonitrile (=100 parts by weight of dry substance)
10.0 parts by weight of a 50% by weight silicone oil emulsion (100–1000 cP) in a 2% aqueous solution of the condensation product of 1 mol of benzyl phenyl phenol and 20 mols of ethylene oxide,
1.0 part by weight of a polyether siloxane,
8.0 parts by weight of benzyl phenyl phenol,
75.0 parts by weight of water,
41.0 parts by weight of a vulcanisation paste of 2 parts by weight of colloidal sulphur, 5 parts by weight of zinc oxide, 1 part by weight of zinc diethyl dithiocarbamate, 5 parts by weight of titanium dioxide, 1 part by weight of sodium diisopropyl dithiocarbamate and 27 parts by weight of a 5% aqueous solution of a condensation product of naphthalene sulphonic acid with formaldehyde.

The coagulation point of this latex mixture is approximately 40° C.

Comparison Test 1

This test is carried out in exactly the same way, except that neither the silicone oil emulsion nor the sodium diisopropyl dithiocarbamate (very quick accelerator) is added. In addition, vulcanisation is carried out in hot air at a temperature of from 110° to 130° C. and not in a steam atmosphere. The material thus obtained has a water vapour absorption capacity of 0.6%.

The results are summarised in Table 1. The corresponding values for skiver are also shown for comparison.

EXAMPLES 2 to 4

A random fibre fleece consisting of 60% by weight of polyamide fibres (approximately 40 mm staple length, 1.5 den) and 40% by weight of polyester fibres (approximately 40 mm staple length, 1.5 den), is impregnated with an excess of a latex mixture having the composition specified below, so that 100 g of solids are taken up from the latex mixture per 100 g of fibre material. The impregnated fleece is then quickly heated to 50° C., as a result of which the latex mixture gels. After vulcanisation with steam for 30 minutes at 105° C., the fleece is dried in hot air. The fleece is then split so that the end product has the layer thickness indicated in Table 2. A microporous base material for artificial leather is obtained. The fleeces have a water vapour absorption capacity of from 4 to 5% (as determined by the method described below; cf. Table 3).

The latex mixture used has the following composition:
210.0 parts by weight of a 47% latex of a copolymer of 60.0% by weight of butadiene and 36% by weight of acrylonitrile and 4.0% by weight of methacrylic acid (=100 parts by weight of dry substance),
(a) 15 parts by weight of stearyl isocyanate, 33% emulsion, or
(b) 15 parts by weight of a mixture of polyether siloxane with polyethylene, 33% emulsion, or
(c) 30 parts by weight of the condensation product of methylolated melamine with behenic acid, 16.5% emulsion, or
(d) 30 parts by weight of polyvinyl methyl ether, molecular weight approximately 50,000, 16.5% emulsion, 1.0 part by weight of a polyether siloxane,
2.0 parts by weight of benzyl phenyl phenol,
75.0 parts by weight of water,
41.0 parts by weight of a vulcanisation paste of 2 parts by weight of colloidal sulphur, 5 parts by weight of zinc oxide, 1 part by weight of zinc diethyl dithiocarbamate, 5 parts by weight of titanium dioxide, 1 part by weight of sodium diisopropyl dithiocarbamate and 27 parts by weight of a 5% solution of a condensation product of naphthalene sulphonic acid with formaldehyde.

The coagulation point of this latex mixture is approximately 40° C.

Comparison Test 2

This test is carried out in exactly the same way, except that neither the inert substances which are insoluble both in the rubber and in the other constituents of the latex nor the sodium diisopropyl dithiocarbamate (very quick accelerator) are added. In addition, vulcanisation is not carried out in a steam atmosphere, but in hot air at a temperature in the range of from 100° to 130° C. The material thus obtained has a water vapour absorption capacity of 0.6%.

The results are summarised in Table 2 and 3. The corresponding values for skiver are also shown for comparison.

Table 1

| | Direction | Layer thickness (mm) according to IUP4 | Tensile strength kp/cm² (DIN 53328) | Elongation at break % (DIN 53328) | Tear propagation resistance kp/cm (DIN 53329) | Stitch tear resistance kp/cm (DIN 53329) | Repeated flexural strength (1) IUP 20 | Extension (2) Pressure atms gauge | I% | II% | Water-vapour take-up (3) after 4 hrs % | after 8 hrs % | after 24 hrs % |
|---|---|---|---|---|---|---|---|---|---|---|---|---|---|
| Comparison Test | longitudinal | 1.0 | 78 | 90 | 44 | 69 | < | 3.6 | 25 | 11.5 | 0.6 | 0.6 | 0.6 |
| | transverse | 1.0 | 97 | 110 | 39 | 64 | | | | | | | |
| Example | longitudinal | 0.9 | 58 | 90 | 27 | 62 | < | 3.2 | 25 | 10.3 | 4.4 | 4.5 | 4.6 |
| | transverse | 0.9 | 106 | 70 | 35 | 61 | | | | | | | |
| Skiver | longitudinal | 1.5 | 198 | 50 | 48 | 140 | > | — | — | — | 5.3 | 5.9 | 6.9 |
| | transverse | 1.5 | 203 | 50 | 52 | 130 | | | | | | | |

(1)Bally-Flaxometer, flexing (dry) 200,000 times (IUP 20)
(2)Extension, Bally-Tensometer (IUP 13)I = linear extension
II = permanent extension(3)By the method described below.
<means damaged
>means undamaged

| | Direction | Layer thickness (mm) according to IUP4 | Tensile* strength kp/cm² (DIN 53328) | Elong.-* ation at break % (DIN 53328) | Tear* propagation resistance kp/cm² | Stitch* tear resistance kp/cm (DIN 53329) | Flexural* strength (1) IUP20 | Extension (2) (IUP 13) Pressure atms gauge | I% | II% |
|---|---|---|---|---|---|---|---|---|---|---|
| Comparison Test | longitudinal | 1.0 | 78 | 90 | 44 | 69 | < | 3.6 | 25 | 11.5 |
| | transverse | 1.0 | 97 | 110 | 39 | 64 | | | | |
| Example | longitudinal | 1.1 | 58 | 90 | 27 | 62 | < | 3.2 | 25 | 10.3 |
| | transverse | 1.1 | 106 | 70 | 35 | 61 | | | | |
| Skiver | longitudinal | 1.4 | 198 | 50 | 48 | 140 | > | — | — | — |
| | transverse | 1.4 | 203 | 50 | 52 | 130 | | | | |

(1)Bally-Flexometer, flexing (dry) 200,000 times (IUP 20)
(2)Extension, Bally-Tensometer (IUP 13)
<means damaged
>means undamaged
I=linear extension
II=permanent extension
*These values ae substantially identical for the artificial leather materials obtained with expanding agents a) to d).

Table 3

|  | Water vapour uptake* | | |
|---|---|---|---|
|  | after 4 hours % | after 8 hours % | after 24 hours % |
| Comparison test | 0.6 | 0.6 | 0.6 |
| Skiver | 5.3 | 6.2 | 6.9 |
| Example a) | 1.4 | 2.1 | 3.9 |
| Example b) | 1.7 | 2.2 | 4.4 |
| Example c) | 1.5 | 2.7 | 4.4 |
| Example d) | 1.7 | 2.2 | 4.8 |

*by the method described below

The water vapour absorption capacity was determined as follows:

The test specimens (measuring 50×20 mm) were prepared for 24 hours at 20° C. in a conditioned room with a relative air humidity of 65%. Thereafter they were accurately weighed (to 0.0001 g) and then introduced into a conditioned room with a relative air humidity of 86% at 20° C. After storage for 4, 8 and 24 hours, they were reweighed and the increase in weight determined to an accuracy of 0.0001 g.

The result of measurement is the percentage increase in weight based on the weight obtained after conditioning. The results quoted are averages of three individual results.

We claim:

1. A vulcanization paste comprising 0.5 to 10.0 parts by weight of zinc oxide, 0.2 to 10.0 parts by weight of sulphur, 0.2 to 3.0 parts by weight of a water soluble accelerator, 0.2 to 3.0 parts by weight of a water insoluble accelerator, 2.0 to 15.0 parts by weight of titanium dioxide, 0.1 to 5.0 parts by weight of a dispersing agent and 10.0 to 50.0 parts by weight of water.

* * * * *